United States Patent Office 3,345,017
Patented Oct. 3, 1967

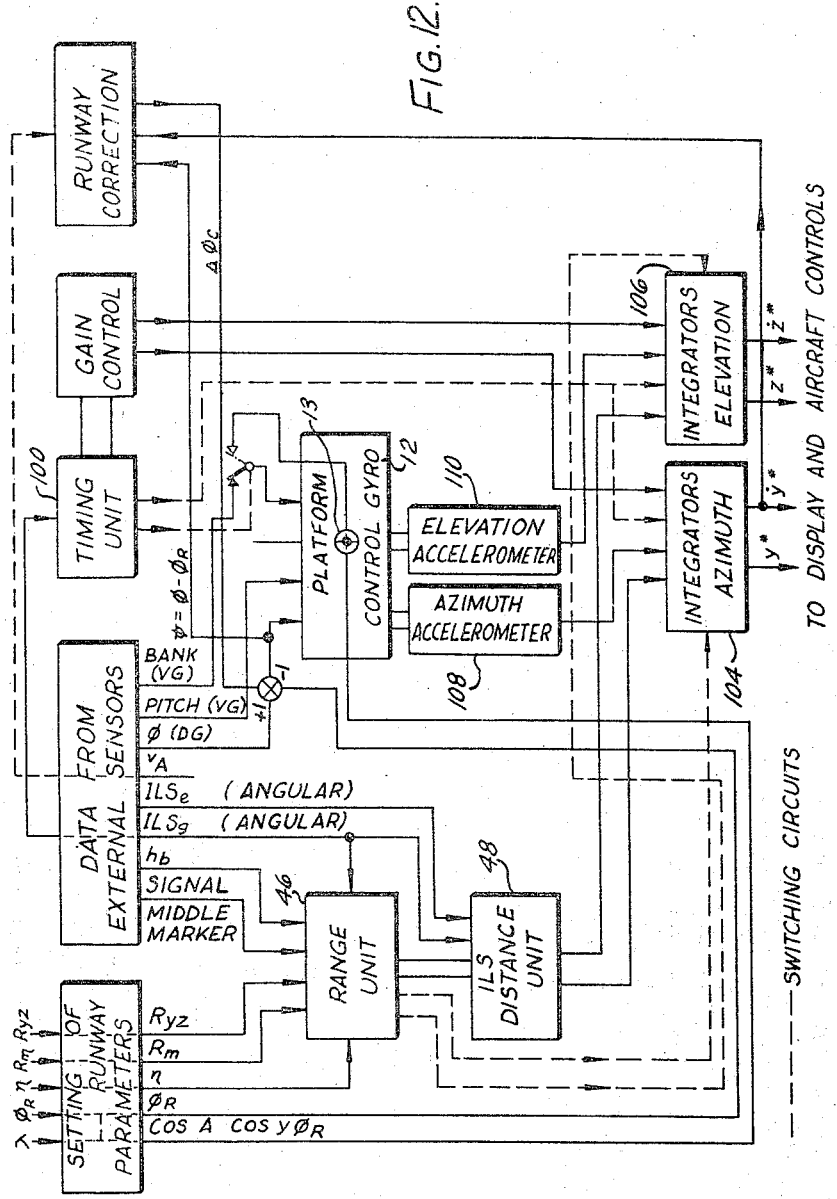

3,345,017
AUTOMATIC GUIDANCE AND LANDING SYSTEM FOR AIRCRAFT
George Olah, London, England, assignor to Elliott Brothers (London) Limited, London, England, a British company
Filed Apr. 12, 1965, Ser. No. 447,380
Claims priority, application Great Britain, Apr. 14, 1964, 15,469/64
12 Claims. (Cl. 244—77)

The present invention relates to an all-weather aircraft landing system and particularly to such a system which is intended to relieve the pilot of action during final approach, flare-out, and (if required) after touch down. The invention relates to cases in which it is assumed that I.L.S. facilities exist, or some system which affords to the aircraft indications or signals of the same nature as those afforded by I.L.S. and the term I.L.S. is intended to include any such facilities.

A primary requirement for an all-weather landing system is to provide during the landing approach up to touch-down reliable information on deviations from desired glide slope path and the velocities of these deviations independent of external disturbances (gusts, windshear or as the latter is sometimes called wind gradient). These deviations are herein referred to as cross beam deviation and are measured in the case of azimuth or lateral deviations in horizontal direction perpendicular to the flight path and in the case of elevation deviation in vertical direction.

I.L.S. alone does not fulfill this requirement.

(a) It leaves an information gap between inner I.L.S. limit and touch-down in azimuth, and between inner I.L.S. limit and radio altimeter altitude in elevation.

(b) It is very noisy, especially on cross beam velocity; efficient filtering would cause a large time delay in the detection of external disturbances, preventing timely corrective control action.

An object of the present invention is to provide a system to close the information gap and to achieve optimum filtering of I.L.S. information without incurring an intolerable time lag in detecting external disturbances by using I.L.S. information to monitor and to introduce corrections to, an inertial navigation system.

It is also an object of the present invention to provide such a system which can be operated as a pure inertial system during run-out after touch down.

The present invention provides an aircraft landing system comprising an inertial navigation system to produce cross-track lateral and vertical distance information signals, means for receiving and converting I.L.S. angular information to lateral and vertical distance information signals, a comparator circuit to compare the former signals with the latter signals and to produce difference signals in response to any difference therebetween, and means for correcting operation of the inertial system in response and according to said difference signals.

The basic information provided by the inertial system consists of the acceleration components along the north, east and vertical axes. These accelerations can then be resolved into the following components:

(a) Azimuth cross beam or lateral acceleration, obtained by resolving the north and east accelerations in a direction perpendicular to runway axis (knowing the runway heading).

(b) Range acceleration, obtained by resolving the north and east accelerations in a direction parallel to the runway.

(c) Elevation cross beam or vertical acceleration, obtained by resolving range acceleration and vertical acceleration in a direction perpendicular to the center of the glide slope beam.

Cross beam velocities and cross beam distances can be obtained by integrating these cross beam acceleration components.

A perfect inertial system, carrying out the integration process from take-off to landing, would yield correct cross beam distances and velocities all the time. However, in the time from take-off to landing approach an actual inertial system develops accumulated errors, which may be relatively small for long range navigational purposes (say of the order of a few miles distance error and say 5 ft./sec. for any particular velocity component) but far in excess of what can be permitted at landing approach. Consequently the pure inertial information has to be monitored and adjusted from information obtained primarily from I.L.S.

In view of the large noise content of instantaneous I.L.S. indication and the still larger noise content of its derivative, it is practically impossible to readjust the inertial system instantaneously at the interception of I.L.S. Instead, a gradual adjustment is proposed. I.L.S. distance information is continuously compared during the whole I.L.S. landing approach with the inertial distance outputs, and the differences of the two are fed back as corrections to the inertial system.

In a further aspect of the invention, therefore, the inertial system employed comprises accelerometer means to produce range acceleration, azimuth cross-track acceleration and elevation cross-track acceleration, and integrating-circuit means for integrating each of the latter two accelerations to provide the lateral and vertical velocities and the lateral and vertical distances.

The accelerometer means may be constituted and may derive the required accelerations as follows:

(A) Derivation of accelerations from a complete gyro stabilized platform, which is set up prior to the landing operation. The platform carries 3 accelerometers in, nominally, N, E and vertical, the accelerometer system being set to "0" output at 1 $g$. Azimuth cross track and longitudinal acceleration are obtained from the original output by resolving them according to the data given by run-way heading and glide slope angle. The accuracies required would be those afforded by a high grade and expensive platform.

(B) Derivation of acceleration components based on attitude information from existing directional gyro and vertical gyro. There are two possibilities:

(a) A slaved platform is provided with its main axes (outwards to inwards) in the "0" position longitudinal, transverse, vertical. The outer gimbal is set according to bank attitude, the middle gimbal to pitch attitude indicated by the vertical gyro, the inner gimbal is set to relative heading (compass indication-run-way heading). The inner gimbal represents a horizontal platform on which the accelerometers are located, the lateral accelerometer being positioned perpendicular to its axis and thereby directly measuring lateral acceleration. Longitudinal and vertical accelerometers are mounted inclined to the glide slope angle and measure also directly without further resolution the respective accelerations. The outputs have again to be set so that they are 0 at 1 g vertical acceleration. The horizontal platform may carry an integrating gyro the output of which is fed to the integrating means to correct vertical gyro errors. Alternatively the platform may carry a control gyro to maintain platform attitude.

(b) The accelerometers are mounted in aircraft axes and their outputs resolved according to pitch and bank data from a vertical gyro (V.G.) and relative heading from a directional gyro (D.G.). The resolution procedure is very involved, especially as no constant compensation for vertical 1 g can be provided, as in case A and B(a), but the g compensation dependent on actual pitch and bank.

Of these three possible arrangements, the slaved platform is preferable on the basis that it is the simplest and the least expensive.

To compare I.L.S. information with inertial output, the angular I.L.S. information must be converted to distance information by multiplying with range. Range may be obtained, when a complete gyro-stabilized platform is used, by appropriate integration of range acceleration or, when a slaved platform is used, by continuous triangulation from altitude in relation to I.L.S. glide-slope information, and altitude may be obtained by barometric signals. Range may be monitored at the outer and middle markers and initially on interception of the glide-slope beam by the range derived from triangulation.

The invention will now be further described, by way of example only, with reference to particular embodiments as illustrated in the accompanying drawings in which:

FIGURE 12 is a block diagram of the complete system of a second embodiment of the invention;

Figure 1:
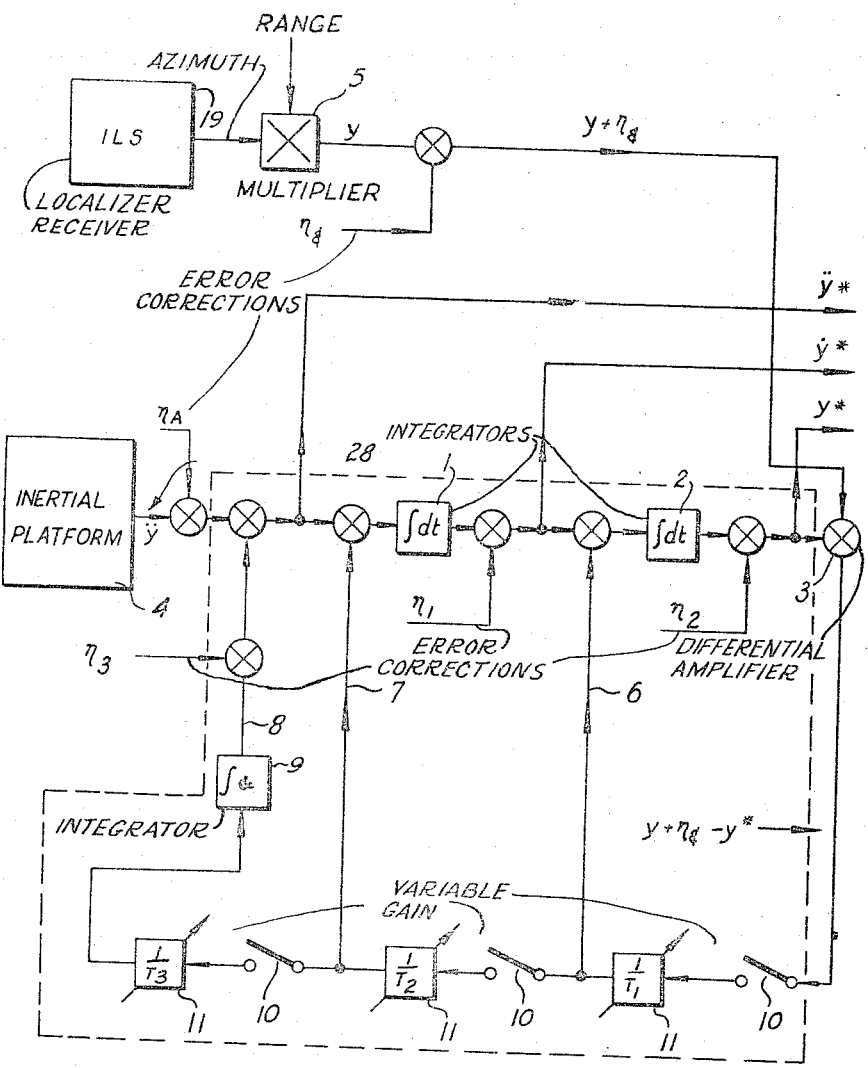
FIGURE 1 is a block diagram for an azimuth guidance circuit of one embodiment of the I.L.S. monitored inertial system of the present invention.

Referring now to the drawings, FIGURE 1 shows the azimuth guidance circuit employed in the first embodiment of the invention. The elevation guidance circuit is substantially the same and the extent to which it may differ is discussed below. In view of this, it is not considered necessary separately to describe and illustrate the elevation guidance circuit. It may be seen from FIGURE 1 that the circuit comprises two integrating circuits 1, 2 (hereinafter called integrators) and a differential amplifier 3 with integrator 1 receiving the output of an azimuth accelerometer from a complete gyro-stabilized platform 4, integrator 2 the output of integrator 1 viz: azimuth velocity, and the differential amplifier receiving the output of the integrator 2 viz azimuth deviation, and the output of a multiplier 5 in which I.L.S. angular information supplied by the I.L.S. localizer receiver 19 is multiplied by range. The output of the differential amplifier is fed back respectively to the accelerometer output, the input of integrator 1 and the input of integrator 2, by feed-back paths 6, 7 and 8; feed-back path 8 containing a further integrating circuit 9 (hereinafter called integrator 9) to integrate the feed-back signal. Each of the feed-back paths contains circuit-breaking means 10 and a variable gain unit 11 to determine the time constants of integrators 1, 2 and 9. The integrating circuits presently preferred are of the type known in the art as Miller, or the type known as Velodyne. The outputs taken from the circuit are corrected lateral acceleration indicated by $\ddot{y}^*$, corrected lateral velocity indicated by $\dot{y}^*$ and corrected lateral deviation indicated by $y^*$.

The basic properties of the system may be derived as Laplace Transforms and can be summarized as follows:

(1)(a) During the I.L.S. monitored period the system gives cross beam distances and velocities corresponding to filtering the I.L.S. distance with a first order filter with time constant of the order of 10 to 20 secs., and of I.L.S. velocity by a second order filter with the same order of time constants. The response to external disturbances due to gusts, etc. (which in a pure I.L.S. system would have time lags corresponding to the filter time constants) would be practically instantaneous. Thus cross beam distances and velocities obtained from the system would be eminently suitable for controlling the aircraft. The control loop would be essentially independent of the I.L.S. filtering lag, thus enabling a tight control to be exercised. At the same time the high degree of filtering would provide very smooth steering signals.

(b) At the inner I.L.S. limit the correcting feed-backs are switched off and the system is working on pure inertial information, adjusted by previous I.L.S. monitoring. It continues to give cross beam distance and velocity indication until touch down or even on the runway in azimuth and up to the flare limit (where radio altimeter takes over) in elevation. The system indication during the pure inertia phase is again essentially independent of external disturbances.

(c) In addition, range information is provided up to the end of the run out.

(2) *Error analysis.*—Errors can arise from the following sources:

(2.1) *I.L.S. errors.*—These are substantially reduced by smoothing, thus enabling the I.L.S. range to be extended even at facilities which become very noisy beyond the 200 ft. altitude limit.

(2.2) *Initial setting errors.*—These cause decaying transient indication errors, which are as follows:

(a) *Initial distance error, $Y_o$.*—If no other provisions are made at the start of I.L.S. monitoring the aircraft may be anywhere within the beam, so that if the second integrator starts with zero output, the maximum known distance error would be that corresponding to half the beam width. This initial error can be substantially reduced by increasing the gain for a short time, i.e. reducing time constant $T_1$ of the feed-back to the second integrator to, say the order of 0.1 sec. Then within a few tenths of a second the initial inertial distance indication becomes almost equal to the I.L.S. distance indication and the initial distance setting error becomes equal to the I.L.S. distance error. This is very much smaller and will not exceed one fifth of the half beam width. The corresponding indication errors can be included in the evaluation of I.L.S. errors.

(b) *Initial velocity error, $\dot{Y}_o$.*—This is the accumulated velocity error of the inertial navigator from take off to the landing approach. It may amount to 5 ft./sec. maximum (95% probability).

(c) *Initial acceleration error resulting from vertical and accelerometer bias error, $\ddot{Y}_o$.*—This can be expressed as a resultant acceleration error. It is assumed that it corresponds to an equivalent vertical error of one minute of arc, corresponding to an acceleration error of .01 ft./sec.$^2$ (95% probability). If no third integrator were provided, the effect of the initial accelerometer error would be—apart from smaller transients—a steady state error, which may become comparatively large with the large time constant required to smooth I.L.S. Representative values in azimuth would be 11 ft. at touch-down and 30 ft. at the end of the run out.

The third integrator substantially reduces the steady state error. In elevation the effect of vertical error is reduced by the sine of the glide slope angle and becomes very small, thus the resulting acceleration error can be assumed to be $10^{-4}$ g, representing accelerometer bias error only. Due to the shorter duration of the pure inertia phase its effect is further reduced. Representative values at the beginning of flare out would be a distance error of 2.4 ft. and a velocity error of 0.13 ft./sec.

This error may be tolerable; thus in elevation the third integrator can possibly be omitted.

(2.3) *Platform azimuth error.*—A typical value of platform azimuth error $\delta\psi=0.25°$ (95% probability). This has no influence as long as the ground speed is constant. However, if there is an acceleration along the range, a cross beam acceleration error of $\delta\psi\dot{V}$ occurs in azimuth, causing cross beam distance and velocity errors at touch down and at the end of the run out. Range accelerations before touch down may occur due to windshear and gust effects; during the run out there is a considerable deceleration (say of 2.0 g). At touch down the distance error due to platform position and range acceleration error is small (order of 1 ft. or less)—at the end of the run out it may amount to 16 ft. at a ground speed of 220 ft./sec. and 4.8 ft. at 120 ft./sec.

(2.4) *Instrument errors.*—These are:
(a) Vertical gyro wander rate and corresponding change of platform position (assumed to be 0.02°/hour).
(b) Change of accelerometer bias.
(c) Drift of third integrator. All these errors give the same effect—a resulting change of acceleration input bias during the I.L.S. monitored and subsequent pure inertial phase. Error components (2.4)(a), (b), (c), can be represented as an initial setting error $\ddot{Y}_o$, representing acceleration error rate. Its total R.M.S. value can be estimated as that resulting from the gyro wander rate only with a 50% addition. The steady state value is not eliminated by the third integrator.
(d) Errors of the first and second integrators, differential amplifiers and resolvers are generally so small compared with other instrument errors that they can be ignored, when computing resultant R.M.S. errors.

Figure 2:
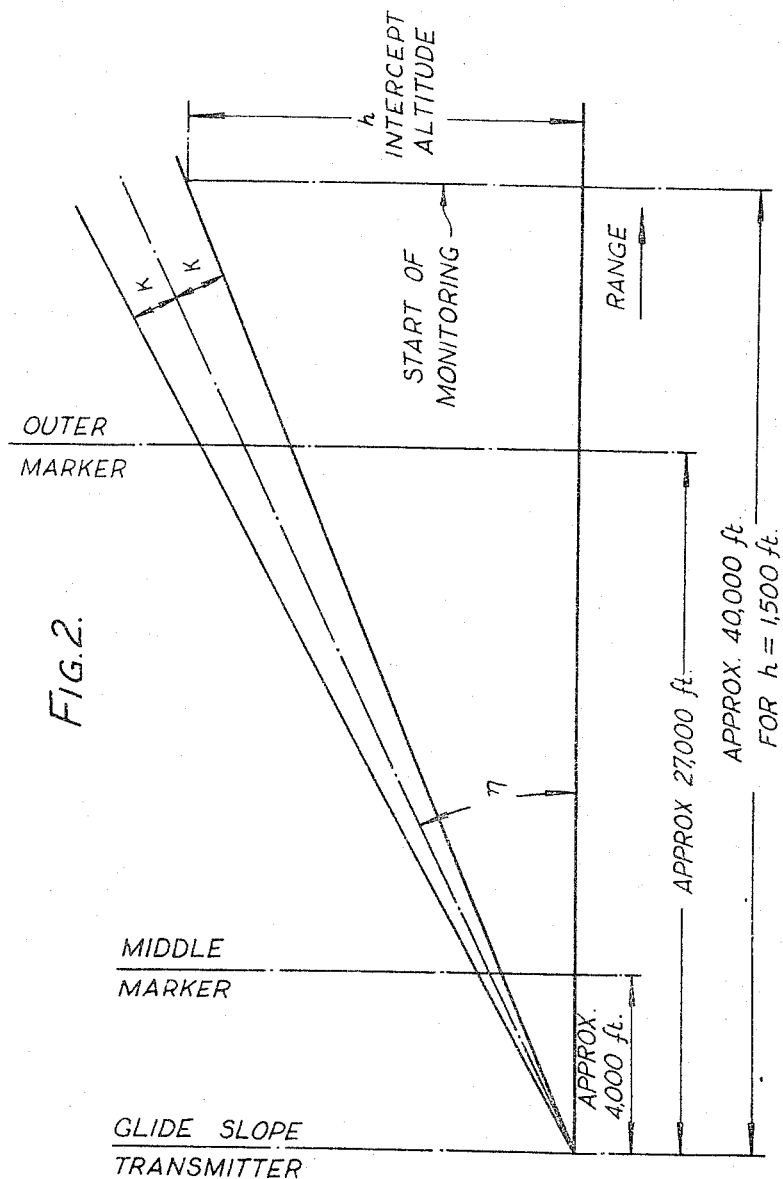
FIGURE 2 is a diagram of a flight profile in the vertical plane.

(2.5) *Range errors.*—Range indication obtained by integrating longitudinal velocity is set and respectively reset at the following points:

(a) Glide slope interception. It may be seen from FIGURE 2 that the glide slope range is $$R_z = \frac{h}{\sin(\eta - K)}$$

the localizer range is $$R_y = R_{yz} + R_z$$

($R_{yz}$=distance between localizer and glide slope transmitters).

(b) At the center of the outer marker beam.
(c) At the center of the middle marker beam.

Adjustments (b) and (c) could be achieved in the following way:

On reaching the edge of the marker beam, the range is reset according to the marker range and the speed obtained from velocity integration is reduced by half, and when leaving the inner edge of the marker beam, the speed of integration is reset to its original value.

Assuming an error of $\delta h=60$ ft., and I.L.S. error=⅓ of K, and a longitudinal velocity error of 4 ft./sec., an error of outer marker center indication of 250 ft., and an error of middle marker center indication of 30 ft., the maximum values for absolute range errors ($\delta R$) and relative range errors $\delta R/R$ are tabulated in Table 2.5.1.

TABLE 2.5.1. RANGE ERRORS

|  | Interception to Outer Marker | Outer to Middle Marker | Middle Marker to 50 ft. altitude | 50 ft. altitude to end of runout | Ground speed, ft./sec. |
|---|---|---|---|---|---|
| Glide Slope $R_z$, ft | 40,000–27,000 | 27,000–4,000 | 4,000–1,000 |  |  |
| Localizer: |  |  |  |  |  |
| $R_y$, ft | 50,000–37,000 | 37,000–14,000 | 14,000–11,000 |  |  |
| $\delta R$, ft | 4,000–4,400 | 250–1,020 | 30–130 | 130–270 | 120 |
| Glide Slope $\delta R/R_z$, percent | 10–16 | 9–25 | 1–13 |  |  |
| Localizer $\delta R/R_y$, percent | 8–12 | 1–7 | 0–1 |  |  |

The effect of range errors on cross beam indication errors is twofold, Firstly, I.L.S. distance error can be increased (or decreased) approximately by the percentage $\delta R/R$. Secondly, in the absence of range errors the system response to external disturbances (apart from negligible instrument lags) is instantaneous, i.e. if the steering signals are utilized in the aircraft control loop, the feedback through the I.L.S. monitored inertial system does not involve any phase lag or frequency variable gain. This is slightly modified when range errors are present. In the worst condition ($\delta R/R = 25\%$) the I.L.S. monitored inertial system may give an increase in gain of 2 db and a phase lag of 9°. The effect is comparatively small and proportionately less for smaller values of $\delta R/R$. Furthermore, for frequencies above 0.08 c./s., phase and gain changes reduce to negligible values. Thus range errors will effect control stability only very slightly.

(3) *Choice of time constants.*—The following considerations have been applied:
  (a) The system should be critically damped to avoid resonance effects.
  (b) Feedback through the third integrator generally increases indication errors due to I.L.S. Thus this feedback should be just large enough (or $T_3$ small enough) to wash out the initial acceleration error sufficiently. These considerations determine the ratio of time constants $T_1$, $T_2$, $T_3$ during the latter part of the landing approach. Given the ratios, the system performance can be characterized by a single time constant T.
  (c) The actual value of the time constant T is also subject to considerations (a) and (b). A larger filter time constant reduces the errors due to I.L.S., but reduces the efficiency of the initial acceleration error washout. A best compromise must thus be sought.
  (d) A sufficient washout of the initial velocity setting error has to be provided. It has been found that a constant gain system with time constants according to requirements (a) to (c) will give an excessive indication error due to errors in $\dot{Y}_0$.
  (e) Initial distance error $Y_0$ has to be reduced to the I.L.S. distance error value (see section 2.2(a)).

Figure 3:
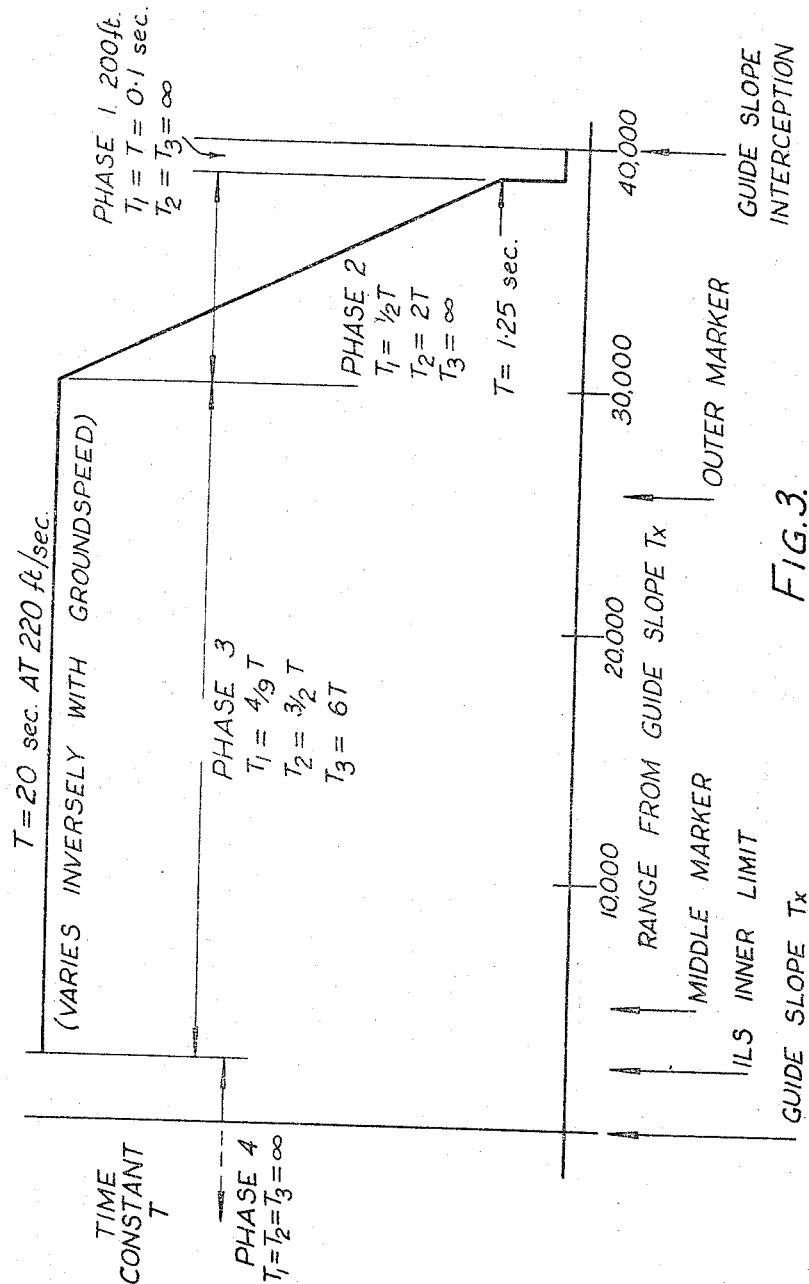
FIGURE 3 is a diagram showing the variation of time (integration) constants with range.

(4) *Variable gain system.*—The conflicting requirements above can best be met by a variable gain system. The subsequent evaluation was based on a variable gain employed with the following characteristics during an approach of four successive phases as shown in FIGURE 3:
  *Phase 1.*—Duration approximately 1 sec. at a groundspeed of 220 ft./sec. and $T_1 = 0.1$ sec. Feedbacks to first and third integrator disconnected. Initial setting error reduced to I.L.S. distance error value.
  *Phase 2.*—Duration approximately 43 sec. at groundspeed 220 ft./sec. Feedback to third integrator stil disconnected; time constant winds up proportionally with time from $T = 1.25$ sec. to $T = 20$ sec. This phase serves to reduce the initial velocity setting error to approximately $\frac{1}{20}$ of its original value; the third integrator is omitted to avoid an accumulation of large unwanted acceleration corrections.
  *Phase 3.*—From here on up to I.L.S. limit. Feedbacks to all integrators connected; time constant $T = 20$ sec. at 220 ft./sec. groundspeed.
  *Phase 4.*—Pure inertia phase. Feedbacks to all integrators disconnected.

FIGURE 3 shows the variation of time constants with range. Furthermore, best performance is obtained by making time constants ($T_1$, $T_2$, $T_3$) inversely proportional to groundspeed. In a system of this kind the error in cross beam distance indication due to I.L.S. errors becomes independent of groundspeed. The error in velocity indication becomes proportional to groundspeed, and the error in acceleration indication becomes proportional to the square of groundspeed at any point in the I.L.S. monitored landing approach.

The indication errors in distance velocity and acceleration at the I.L.S. limit caused by I.L.S. errors uniquely determine (apart from random initial setting and instrument errors) the performance in the subsequent pure inertial phase; i.e. errors at touch down, flare limit and at the end of the run out. These parameters represent the resulting effect of all bends in the I.L.S. beam; and can thus be considered as figures of merit for a particular runway. Generally the influence of the acceleration error term is small and can be ignored.

Figure 4:
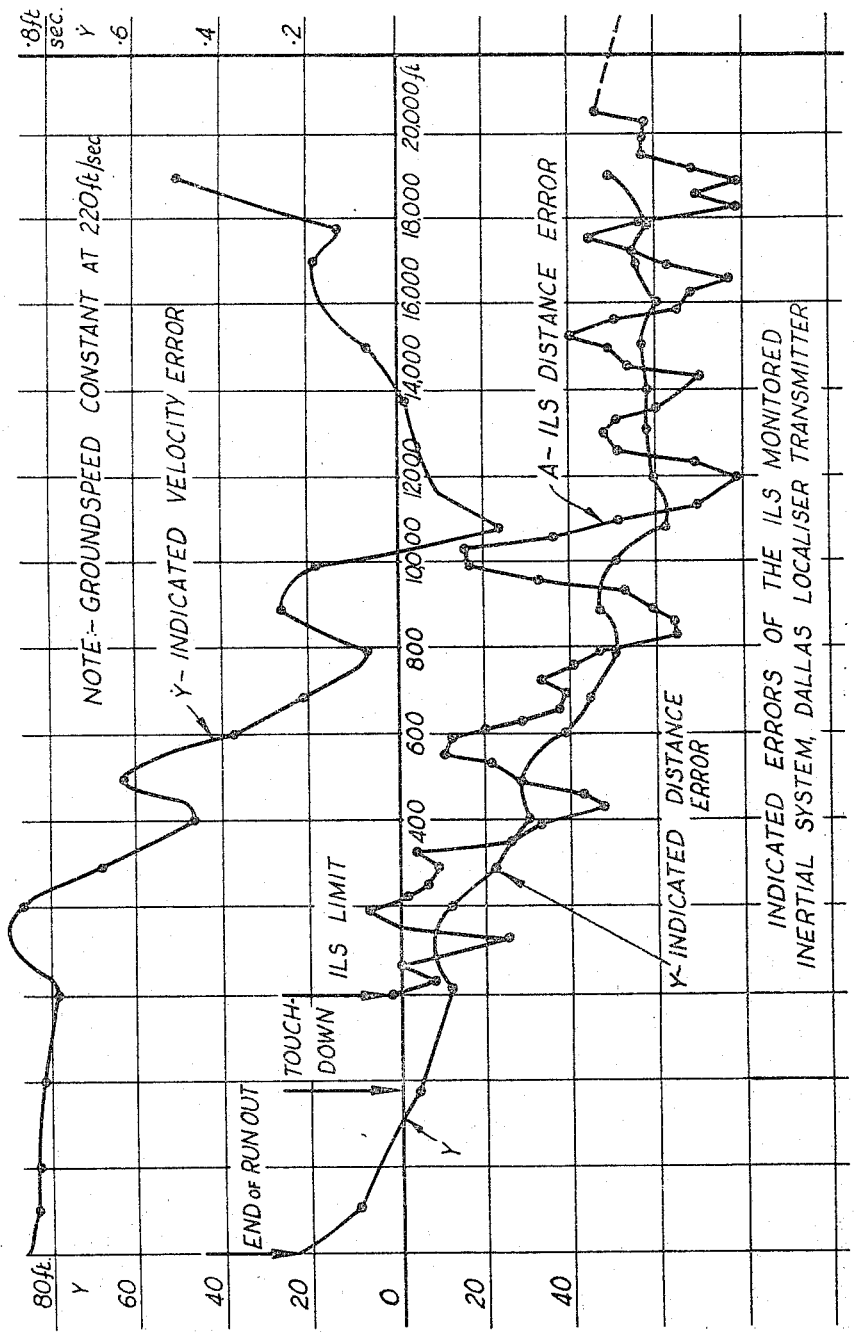
FIGURE 4 is a graph showing indicated errors of the embodiment in respect of the Dallas localizer transmitter in terms of azimuth velocity error, azimuth indicated distance error and I.L.S. distance error with range.
Figure 5:
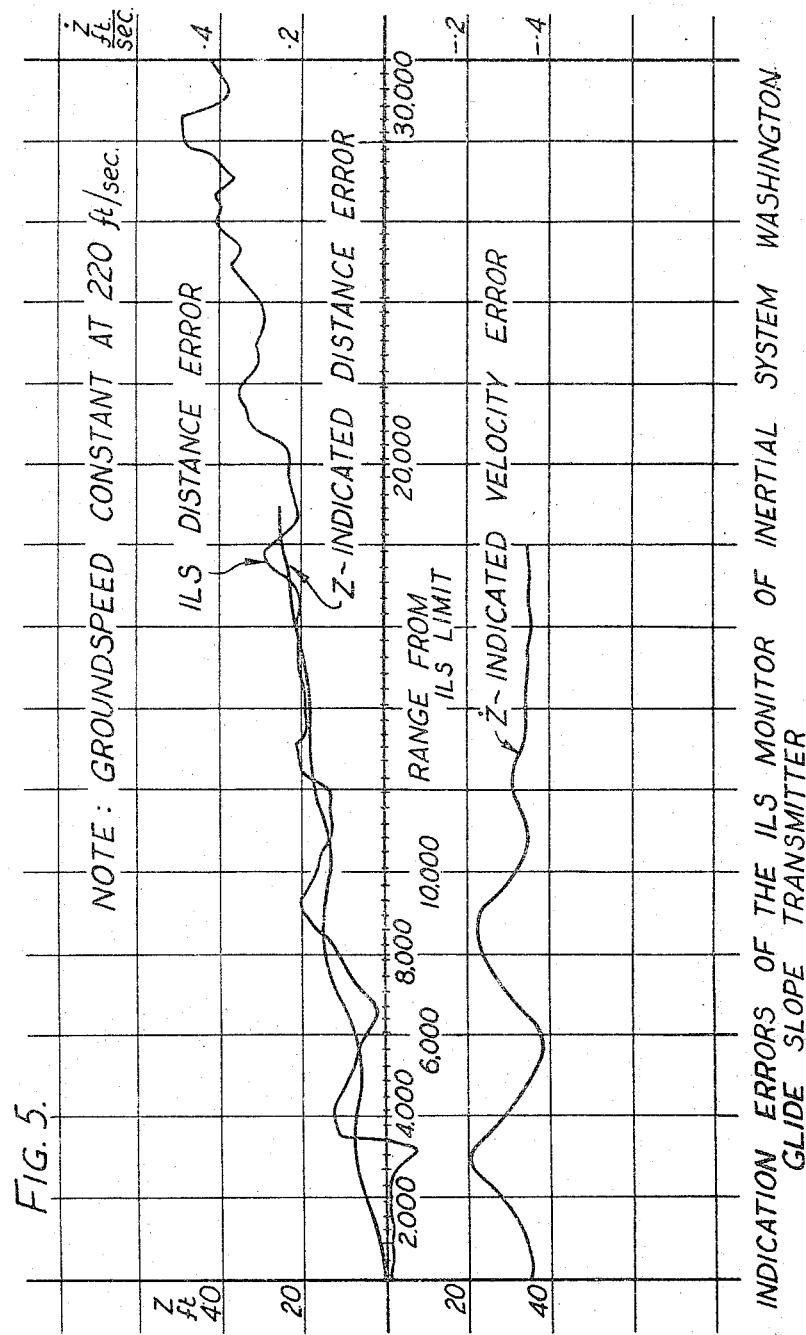
FIGURE 5 is a graph showing indicated errors of the embodiment in respect of the Washington glide slope transmitter in terms of elevation velocity and distance errors and I.L.S. distance error, with range.

(5) *Evaluation of I.L.S. errors.*—Evaluation is based on data published in R.T.C.A. paper 31–63/DO–118 for angular I.L.S. noise for a number of airfield facilities. The indication errors due to I.L.S. were evaluated on a digital computer using transfer functions for indication errors. The initial distance error is also included. FIGURES 4 and 5 show the evaluation for the Dallas localizer facility and the Washington glide slope facility. The I.L.S. distance errors are also shown. The high frequency noise components (above 2 c./s.) were ignored as their effect is negligible due to the large filter time constants. The dotted part of the curve was derived by assuming that the I.L.S. angular error changes linearly with the average slope over the range given by data from the R.T.C.A. paper. As at inner I.L.S. limit, the indication errors are mainly determined by I.L.S. errors in the neighborhood of that limit, and I.L.S. errors beyond 20,000 feet glide slope range have only a very small influence, deviations of actual I.L.S. errors from the assumed linear approximation will cause only insignificant errors at the I.L.S. limit.

Tables 5.1 and 5.2 give computed indication errors $E_T$, $\dot{E}_T$ at touch down and $E_S$, $\dot{E}_S$ at the end of the run out for the localizer; and $E_F$, $\dot{E}_F$ at the beginning of flare out (50 ft. altitude) for the glide slope facilities. The inner I.L.S. limit is taken at 50 ft. altitude and also at 100 ft. altitude.

TABLE 5.1. COMPUTED INDICATION ERRORS FOR 50 FT. I.L.S. LIMIT

| Localizer Facilities | Touch Down Distance Error $E_T$, ft. | | | Touch Down Velocity Error $\dot{E}_T$, ft./sec. | | | Run Out Distance Error $E_S$, ft. | | | Run Out Velocity Error $\dot{E}_S$, ft./sec. | | |
|---|---|---|---|---|---|---|---|---|---|---|---|---|
| V ft./sec. | 220 | 170 | 120 | 220 | 170 | 120 | 220 | 170 | 120 | 220 | 170 | 120 |
| Dallas | −5.2 | −5.2 | −5.2 | .803 | .620 | .438 | 23.0 | 11.3 | 3.2 | .860 | .648 | .448 |
| Ontario | 17.8 | 17.8 | 17.8 | −.160 | −.123 | −.087 | 7.9 | 12.7 | 15.8 | −.428 | −.249 | −.132 |
| S. Francisco | −20.0 | −20.0 | −20.0 | −.078 | −.037 | −.026 | −20.7 | −20.6 | −20.4 | .007 | −.009 | −.017 |
| S. Louis | −13.1 | −13.1 | −13.1 | −.050 | −.039 | −.027 | −14.3 | −13.9 | −13.9 | −.016 | −.022 | −.022 |
| Los Angeles | −26.7 | −26.7 | −26.7 | .120 | .092 | .066 | −20.9 | −23.7 | −25.4 | .223 | .440 | .083 |
| Minneapolis | −3.3 | −3.3 | −3.3 | −.552 | −.427 | −.302 | −24.8 | −15.8 | −9.2 | −.720 | −.506 | −.329 |
| Duluth | 5.9 | 5.9 | 5.9 | −.265 | −.205 | −.145 | −4.2 | 0 | 3.1 | −.334 | −.238 | −.156 |

| Glide Slope Facilities | Flare Limit Distance Error $E_F$, ft. | | | Flare Limit Velocity Error $\dot{E}_F$, ft./sec. | | | | | | | | |
|---|---|---|---|---|---|---|---|---|---|---|---|---|
| Washington | .5 | .5 | .5 | −.374 | −.290 | −.204 | | | | | | |
| New Orleans | −.5 | −.5 | −.5 | .198 | .153 | .099 | | | | | | |
| Chicago | .2 | .2 | .2 | .246 | .190 | .134 | | | | | | |

TABLE 5.2. COMPUTED INDICATION ERRORS FOR 100 FT. I.L.S. LIMIT

| Localizer Facilities | $E_T$, ft. | | | $\dot{E}_T$, ft./sec. | | | $E_S$, ft. | | | $\dot{E}_S$, ft./sec. | | |
|---|---|---|---|---|---|---|---|---|---|---|---|---|
| V ft./sec. | 220 | 170 | 120 | 220 | 170 | 120 | 220 | 170 | 120 | 220 | 170 | 120 |
| Dallas | 3.9 | 3.9 | 3.9 | .973 | .728 | .398 | 37.4 | 23.9 | 11.4 | 1.035 | .771 | .403 |
| Ontario | 21.6 | 21.6 | 21.6 | −.073 | −.057 | −.040 | 15.1 | 18.6 | 20.5 | −.310 | −.168 | −.078 |
| S. Francisco | −23.1 | −23.1 | −23.1 | −.128 | −.099 | −.070 | −26.9 | −25.6 | −29.3 | −.096 | −.084 | −.065 |
| S. Louis | −6.2 | −6.2 | −6.2 | .134 | .104 | .073 | −.4 | −2.9 | −4.7 | .214 | .142 | .086 |
| Los Angeles | −12.8 | −12.8 | −12.8 | .470 | .364 | .256 | 6.3 | −1.9 | −7.8 | .659 | .451 | .289 |
| Minneapolis | −1.5 | −1.5 | −1.5 | −.468 | −.362 | −.255 | −19.7 | −12.0 | −6.5 | −.609 | −.429 | −.278 |
| Duluth | 3.3 | 3.3 | 3.3 | −.308 | −.238 | −.168 | −8.5 | −3.5 | .1 | −.386 | −.275 | −.181 |

| Glide Slope Facilities | $E_F$, ft. | | | $\dot{E}_F$, ft./sec. | | | | | | | | |
|---|---|---|---|---|---|---|---|---|---|---|---|---|
| Washington | −1.5 | −1.5 | −1.5 | −.363 | −.281 | −.198 | | | | | | |
| New Orleans | 1.3 | 1.3 | 1.3 | .212 | .164 | .111 | | | | | | |
| Chicago | 2.0 | 2.0 | 2.0 | .260 | .200 | .140 | | | | | | |

For computation of indication errors at the end of the run out a deceleration of 0.2 g was assumed.

(6) *Reducing errors by I.L.S. calibration.*—Ignoring random errors and acceleration errors at the I.L.S. limit and referring to section 3, the indication error $E_S$ at the end of the run out can be computed from the I.L.S. limit values $E_T$ and the velocity error at 220 ft./sec. ground speed $\dot{E}_{T220}$ as $$E_S = E_T + \frac{\dot{E}_{T220}xv}{220} xt_s$$

where $t_s$ is the time from I.L.S. inner limit to the end of run out. $E_S$ can be measured as the difference of indicated position and actual position at the end of run out, $v$ at I.L.S. limit is given by the inertial equipment and can be recorded and $t_s$ can be measured. Ignoring all other errors, $E_T$, $\dot{E}_{T220}$ could be obtained from two preliminary landings under good visibility conditions. In view of the other errors a larger number of preliminary landings (say of the order of 10) would be required and $E_T$, $\dot{E}_{T220}$ be determined by the method of least squares.

If then $E_T$ is applied as an open loop correction during the whole I.L.S. approach to the distance output and $$\frac{\dot{E}_{T220}xv}{220}$$

as correction to the output of the first integrator, indication errors at touch-down and the end of the run out may be reduced to a fraction of their original values. This procedure may be useful for localizer correction with the I.L.S. limit at 100 ft. altitude (decision limit); at 50 ft. altitude I.L.S. limit or below the errors may be tolerable without any correction. The glide slope errors are in any case very small, and require no correction.

(7) *Other errors.*—The effects of initial setting errors and instrument errors or indication errors are given in Tables 7.1 and 7.2; the values of the individual errors are those given in section 2. They represent 95% probability values.

TABLE 7.1 INITIAL SETTING ERRORS FOR 50 FT. I.L.S. LIMIT

| Localizer Facilities | $E_T$, ft. | | | $\dot{E}_T$, ft./sec. | | | $E_S$, ft. | | | $\dot{E}_S$, ft./sec. | | |
|---|---|---|---|---|---|---|---|---|---|---|---|---|
| V ft./sec. | 220 | 170 | 120 | 220 | 170 | 120 | 220 | 170 | 120 | 220 | 170 | 120 |
| $\dot{Y}_o$ | .6 | .8 | 1.1 | .038 | .038 | .038 | 2.4 | 2.0 | 1.9 | .066 | .054 | .047 |
| $\ddot{Y}_o$ | 1.9 | 3.1 | 6.2 | .113 | .146 | .206 | 7.0 | 7.7 | 10.5 | .192 | .208 | .255 |
| $\dddot{Y}_o$ | .3 | .7 | 2.0 | .023 | .038 | .077 | 1.3 | 2.4 | 3.7 | .040 | .070 | .096 |
| Platform Position | small | small | small | small | small | small | 16.2 | 9.7 | 4.8 | .960 | .758 | .524 |
| Total RMS | 2.0 | 3.3 | 6.6 | .12 | .16 | .22 | 17.9 | 12.8 | 12.3 | .98 | .79 | .59 |

| Glide Slope Facilities | $E_F$, ft. | | | $\dot{E}_F$, ft./sec. | | | | | | | | |
|---|---|---|---|---|---|---|---|---|---|---|---|---|
| $\dot{Y}_o$ | .3 | .4 | .6 | .031 | .031 | .031 | | | | | | |
| $\ddot{Y}_o$ | .3 | .5 | 1.0 | .031 | .040 | .057 | | | | | | |
| $\dddot{Y}_o$ | small | small | small | small | small | small | | | | | | |
| Platform Position | small | small | small | small | small | small | | | | | | |
| Total RMS | .4 | .6 | 1.2 | .04 | .05 | .06 | | | | | | |

TABLE 7.2 INITIAL SETTING ERRORS FOR 100 FT. I.L.S. LIMIT

| Localizer Facilities | $E_T$, ft. | | | $\dot{E}_T$, ft./sec. | | | $E_S$, ft. | | | $\dot{E}_S$, ft./sec. | | |
|---|---|---|---|---|---|---|---|---|---|---|---|---|
| V ft./sec | 220 | 170 | 120 | 220 | 170 | 120 | 220 | 170 | 120 | 220 | 170 | 120 |
| $\dot{Y}_0$ | .8 | 1.0 | 1.5 | .042 | .042 | .042 | 2.7 | 2.3 | 2.2 | .069 | .059 | .051 |
| $\ddot{Y}_0$ | 2.4 | 4.0 | 8.0 | .141 | .176 | .260 | 8.2 | 10.2 | 14.2 | .237 | .280 | .336 |
| $\dddot{Y}_0$ | .4 | .9 | 2.7 | .025 | .042 | .084 | 1.7 | 2.8 | 4.5 | .044 | .078 | .104 |
| Platform Position | small | small | small | small | small | small | 16.2 | 9.7 | 4.8 | .960 | .758 | .524 |
| Total RMS | 2.6 | 4.2 | 8.5 | .15 | .19 | .28 | 18.5 | 14.3 | 15.8 | 1.00 | .80 | .63 |

| Glide Slope Facilities | $E_F$, ft. | | | $\dot{E}_F$, ft./sec. | | |
|---|---|---|---|---|---|---|
| $\dot{Y}_0$ | .5 | .6 | .8 | .035 | .035 | .035 |
| $\ddot{Y}_0$ | .5 | .8 | 1.5 | .032 | .042 | .059 |
| $\dddot{Y}_0$ | small | small | small | small | small | small |
| Platform Position | small | small | small | small | small | small |
| Total RMS | .7 | 1.0 | 1.7 | .50 | .06 | .07 |

(8) *Conclusions from computed results.*—Examples of apparently poor quality facilities (except Minneapolis and Duluth) were chosen from the R.T.C.A. paper for the purpose of I.L.S. evaluation and no attempt was made to optimize for any individual facility. The results indicate that satisfactory performance can be expected for glide slope and for localizer to touch down limit in azimuth. Even at the end of the run out, the indication errors due to I.L.S. errors are reasonable. However, in view of the comparatively large errors due to platform azimuth error during the run out period it could be feasible to adopt the calibration procedure as described in section 6. Furthermore, the results quoted may not represent the absolute optimum achievable, which could be obtained by a closed investigation of the optimization of the variable gain system.

Possible improvements could also be achieved by extending the localizer limit further inwards, which seems to be feasible even for very noisy facilities.

Figure 6:
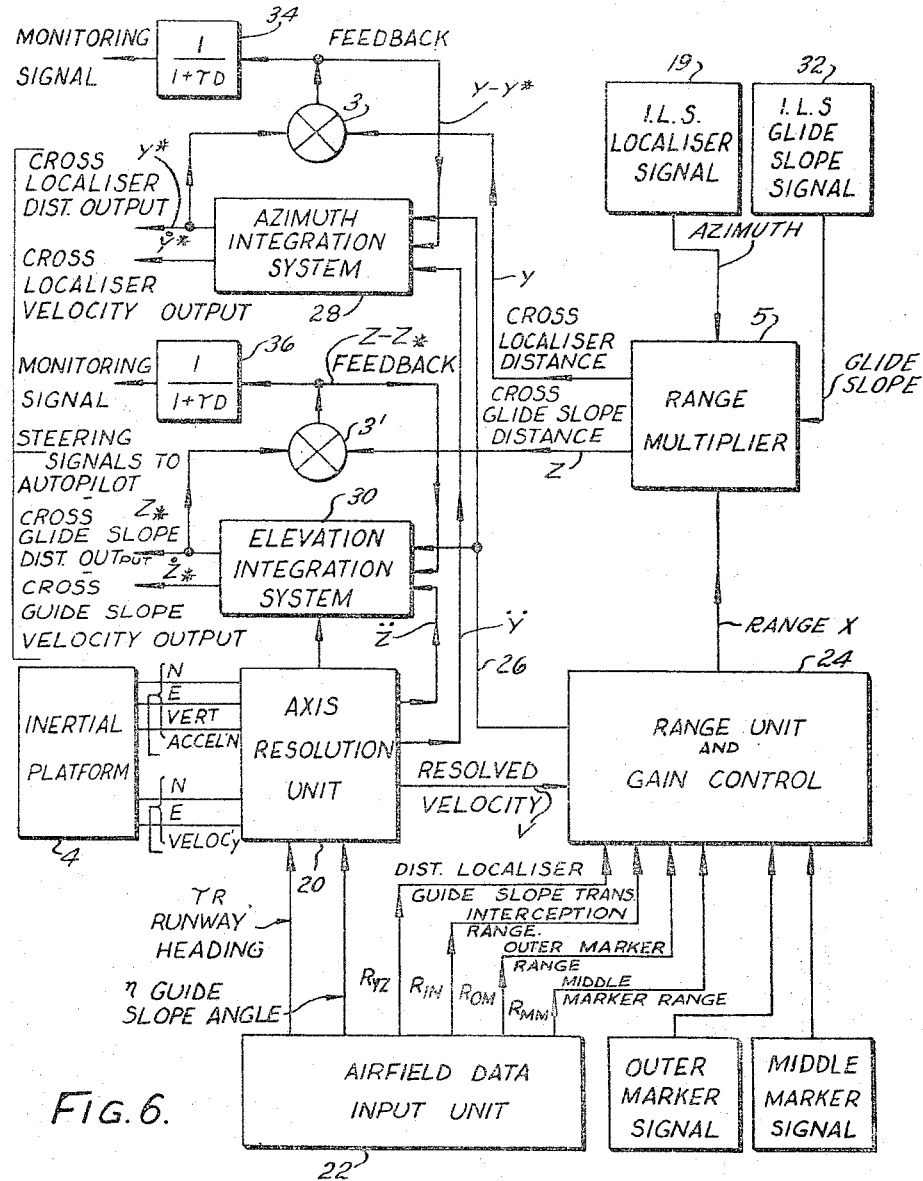
FIGURE 6 is a block diagram of a complete system incorporating the azimuth guidance circuit of FIGURE 1 and a like circuit for elevation guidance.

(9) *Instrumentation.*—The functional block diagram of the azimuth guidance and elevation guidance system is shown in FIG. 6. Where appropriate, the reference characters of FIG. 1 have been incorporated in FIG. 6 but for the sake of simplicity, the various error correction signals of FIG. 1 have not been noted in FIG. 6. In FIG. 6, all of the outputs of the inertial platform 4 are shown applied to the axis resolution unit 20. The north and east acceleration outputs of the inertial platform 4 are resolved, knowing the runway heading $\psi_R$, in a horizontal direction perpendicular to the runway axis to provide the azimuth cross beam acceleration output $\ddot{y}$. The north, east and vertical acceleration outputs are resolved, knowing the runway heading, in a vertical direction perpendicular to the runway axis to provide the elevation cross beam acceleration $\ddot{z}$. The north and east velocity outputs are resolved, knowing the glide slope $\eta$, into velocity $v$ along the beam. Runway heading and glide slope angle signals are supplied by the airfield data input unit 22 and, as well, this unit provides the various signals shown applied to the range and gain control unit 24.

The unit 24 derives range $x$ from the integration of the velocity $v$ along the beam, the integration constants being set at glide slope interception and at the inner and outer markers as described in section 2.5. The gain control signals to the variable gain units 11 (FIG. 1) are provided by the output 26 of the unit 24 and are applied to the azimuth and elevation integration systems 28 and 30 according to the description in section 4. The azimuth integration system 28 consists of the several integrators 1, 2 and 9 and their associated variable gains 11 as described in conjunction with FIG. 1 and as shown therein enclosed by the dashed-line designated by the reference character 28. As previously described, the elevation acceleration system 30 may be identical with the system 28 or may exclude the third integrator 9 (see section 2.2(c)). In any event, the I.L.S. glide slope signal derived from the receiver 32 is applied to the range multiplier 5 to produce the signal representative of the vertical distance $z$ from the glide slope path, which signal is compared at 3' with the corrected elevation cross beam deviation $z^*$ to provide the feedback signal to the system 30 comparable to the feedback signal from comparator 3 for the system 28.

The outputs of the comparative 3 and 3' are smoothed at 34 and 36 for the purpose described below in section 10.

The computations involved in the system can be either performed by analogue or digital means, analogue integrators being accurate enough for this purpose. However, digital computation appears to be particularly attractive as it is probably reasonable to assume that an airborne digital computer forms part of the inertial navigational equipment. Airfield data can easily be introduced, e.g. in digital form on a punched card for each airfield runway. The only additional equipment would be analogue/digital conversion units for the I.L.S. signals—possibly already provided in the computer. Thus additional hardware requirements would be reduced to a bare minimum.

(10) *Self-monitoring.*—During the I.L.S. monitored phase the smoothed outputs of the differential amplifiers 3 and 3' comparing monitored output and I.L.S. gives a criterion for the performance of the computer system—any errors indicating a differential output of larger than say 10 ft. would be a failure indication of one of the system components and consequently a switch over to a duplicate equipment could be effected. During the pure inertial phase (never exceeding 50 sec. duration to the end of run out, 8 sec. to the flare limit and 25 sec. to touch down) the above criterion is no longer valid.

A duplicate system comprising two self-monitored inertial equipments with automatic changeover in the event of a failure is thus required to provide failure survival for the complete automatic landing period.

Figure 7:
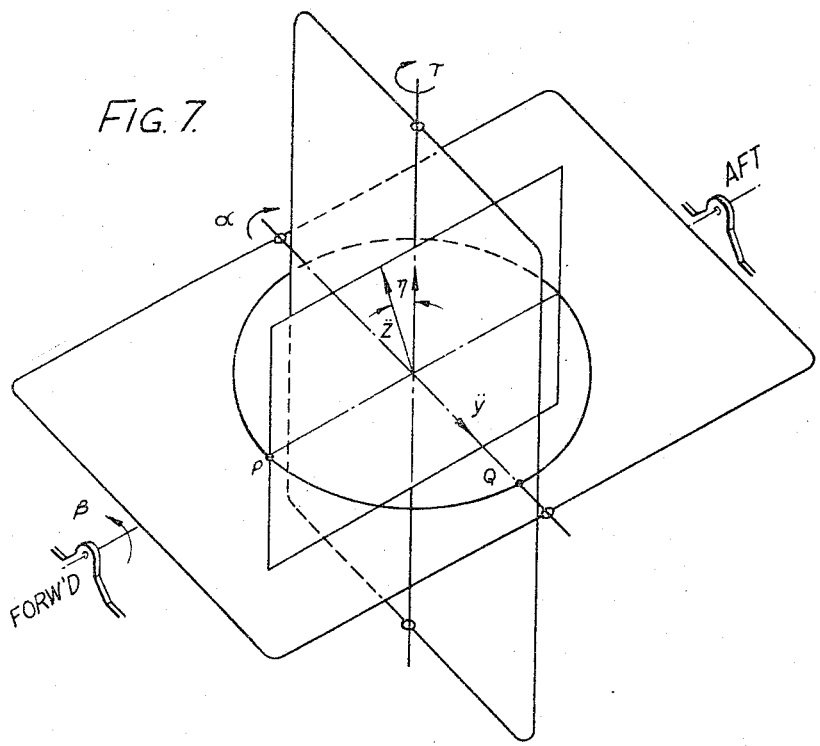
FIGURE 7 is a diagram showing an arrangement for slaving an accelerometer platform to a vertical and a directional gyro.
Figure 8:
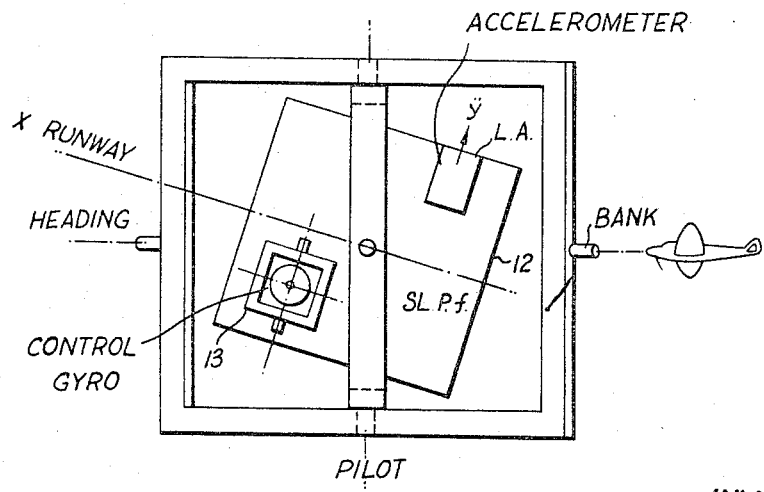
FIGURE 8 is a sketch of an embodiment of a slaved platform as illustrated in FIGURE 7.

In the above-described embodiment, the basic accelerations required are provided by a completely gyro stabilized platform. A cheaper way, however, of producing the basic accelerations is to employ an accelerometer platform slaved to the aircraft's existing vertical gyro (V.G.) and directional gyro (D.G.), and in a further embodiment of the invention such a platform is employed. The manner of slaving the platform is shown in FIGURE 7 and a construction of a suitable platform in FIGURE 8. Referring to FIGURE 7, the outer gimbal and the middle gimbal are set according to bank attitude ($\beta$) and pitch attitude ($\alpha$) respectively as indicated by the vertical gyro, and the inner gimbal is set according to relative heading ($\psi$) as determined by the directional gyro (i.e. compass) indication in relation to runway heading. The inner gimbal represents a horizontal platform 12 on which the accelerometers are mounted; the lateral accelerometer measuring directly cross beam or lateral acceleration. In FIGURE 8 the lateral accelerometer L.A. is shown mounted on the horizontal platform 12 together with a floating gyro 13 of medium quality, e.g. with a wander rate of 0.2°/hour, to reduce lateral accelerometer error due to wander of the vertical gyro, to an acceptable limit e.g. $3.12 \times 10^{-5}$ ft./sec.$^3$. The other accelerometers i.e. elevation and range are not shown for the sake of simplicity but are mounted inclined to the glide slope angle. These accelerometers also measure without further resolution the respective accelerations. The outputs of the three accelerometers need to be set to give a "0" output at 1 $g$ vertical acceleration.

Figure 9:
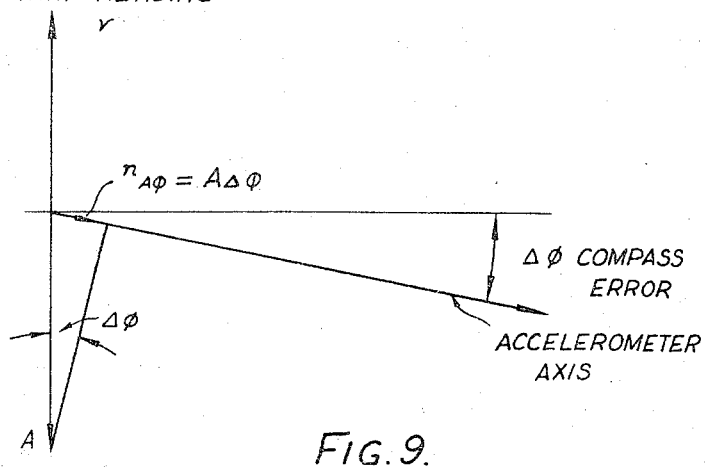
FIGURE 9 is a diagram showing acceleration error due to compass error and longitudinal acceleration.

The use of a slaved platform provides an efficacious and relatively cheap means of producing the basic accelerations but it does give rise to an additional source of error in that the position of the lateral accelerometer is determined by relative heading which is subject to error in the D.G. and this error affects compass indication as shown in FIGURE 9. If there is a compass error from this source, a longitudinal deceleration causes an acceleration error.

Longitudinal accelerations occur during the landing approach due to wind effects, in particular due to windshear and gusts, on the assumption that a constant airspeed is maintained. During the landing approach at constant airspeed the aircraft generally accelerates as the headwind decreases due to windshear (wind gradient).

During the I.L.S. monitored period the acceleration error is reduced due to the feed back system. If the windshear be linear, its effect would be practically fully corrected by the action of the proposed third integrator; in all other cases (nonlinear windshear, gusts) the correcting action of the feedback is only partial; also acceleration errors occur in the subsequent pure inertial phase after I.L.S. has ceased to be effective.

The effect of wind variations, particularly gusts, is somewhat mitigated by aircraft inertia; in the following considerations it is assumed that the essential aircraft response has a quadratic delay determined by the phugoid frequency. Information on wind taken from Elliot Report T. 196, "Wind in Relation to Automatic Landing," by C. S. Durst, gives wind distribution between 500 ft. altitude and ground level. Above that altitude the windshear effect is relatively small; its effect and the effect of gusts would cause only transients, which would be essentially corrected when the I.L.S. limit is reached. Thus the effect at I.L.S. limit of wind above 500 ft. level can be safely ignored.

Figure 10:
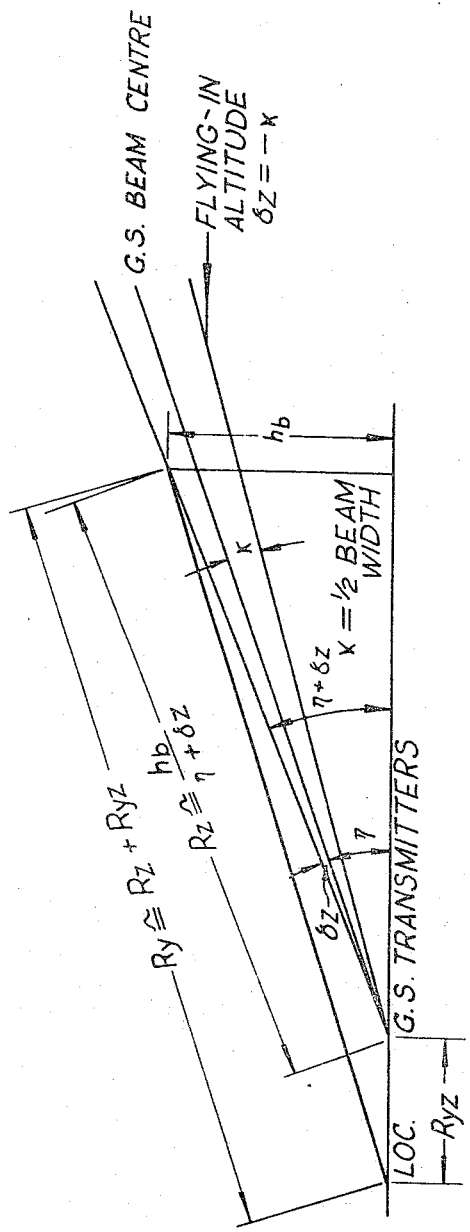
FIGURE 10 is a diagram showing the derivation of range from barometric altitude and glide slope information.

In view of the above, it is not feasible to use the longitudinal accelerometer of the slaved platform to derive range and range must be computed according to FIGURE 10 from altitude measurement $h$ in connection with angular I.L.S. glide slope deviation ($\delta_z$). Referring to FIGURE 10, the glide slope range is $$R_z = \frac{h}{\eta + \delta_z}$$

and the localizer range is $R_y = R_{yz} + R_z$.

In the region between I.L.S. glide slope inner limit (say 200 to 100 ft. altitude) to localizer limit (say 50 ft. altitude) no glide slope information is available and $\delta_z$ is replaced by zero. The derived range is monitored at the middle marker to reduce error and a circuit for deriving range, monitoring at the middle marker and for producing I.L.S. distance information will be described below.

The use of the slaved platform does not prevent extension of the use of the system beyond touch-down. Error values due to I.L.S. noise are ascertainable, e.g. for a ground speed of 200 ft./sec. to the instant, when the aircraft, finishing its run out, comes to a stop. For example, a deceleration of 0.2 $g$ is assumed, corresponding to a running-out time of 31 sec. and a distance from touchdown to stop of 3100 ft. The errors, (based on an example of time constants which is achieved for all ground speeds by the variable gain system described in section 4) are small. This suggests a possible extension within this invention, of range of the inertial system beyond touch down to final stop. In nil or low visibility, run-out on a runway involves a risk which a competent system will cope with, and this invention may, finally, cope.

As in the variable gain system the effect of initial transients is reduced to negligible values. In a system based on a high grade gyro stabilized platform the errors $E_S$ would represent practically all the errors, and thus extension of range into the ground-borne phase is possible.

In case of the platform slaved to V.G. and D.G. and corrected by a single additional gyro, compass errors in connection with longitudinal deceleration would cause very large cross beam deviation errors (up to 100 ft.) at "stop" for a compass error of 2° at 0 headwind. In case of windshear, the windshear errors are of opposite sign and thus partially cancel out the deceleration errors during run out.

To reduce this error there is an arrangement of the invention in which after touch down, the compass error is corrected. The correction procedure is based on the assumption that after touch down, when the aircraft has sufficiently slowed down (say after ca. 5 sec.) the under-carriage takes a larger portion of the weight of the aircraft and can be so adapted as to signal such condition, and in this condition no sideslip on the under-carriage wheels is likely to occur, and the instantaneous direction of the run out path must coincide with aircraft heading. Were it not so, very small external disturbances (gusts) would cause an uncontrollable side slip, just as in the case of skidding motor cars, e.g. due to an ice patch, or other local, immediate, condition.

As to this assumption, sufficient data are available to compute the value of compass error; to subsequently correct the platform position by the computed amount, and also to apply corrective terms to the deviation and velocity output, in principle completely cancelling the fortuitously induced error.

Additional apparatus requires is:

(1) Tachometric device on an undercarriage wheel to give rotational speed and thus determine ground speed. This device may be omitted and the parameter estimated as explained hereinafter.

(2) Computing circuit for effecting runway correction as hereinbelow described.

Figure 11:
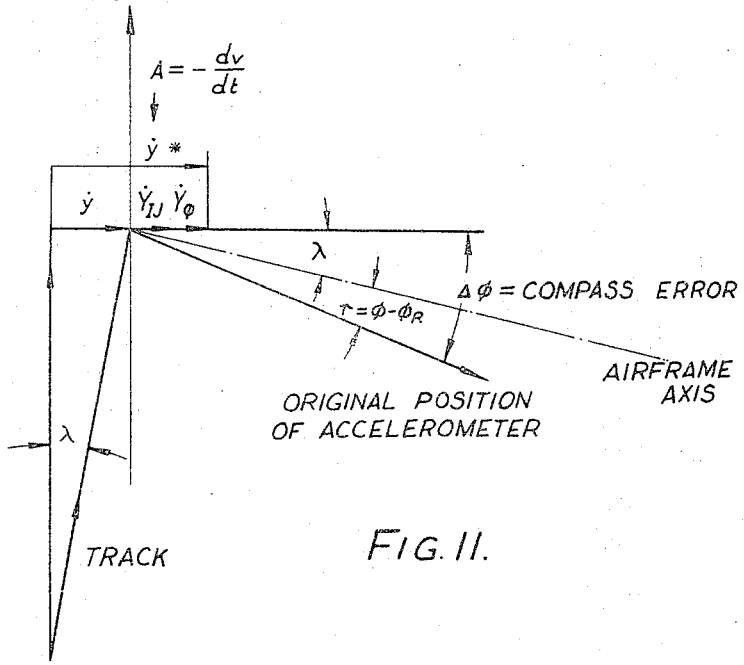
FIGURE 11 is a diagram showing the parameter involved in correction of compass error.

According to FIGURE 11, at the instant of making the correcting actions the direction of the run-out track is determined by $$\tan \Lambda \simeq \Lambda = \frac{\dot{y}}{V_C}$$

where:

$\dot{y}$ = true cross beam or lateral velocity.
$v_<$ = longitudinal velocity (ground speed).
$v_C$ = longitudinal velocity (ground speed) at the instant of erection.

If $\dot{y}^*$ is the cross beam or lateral velocity indicated by the inertia equipment, $$\dot{y}^* = \dot{y} + \dot{Y}_{IJ} + \dot{Y}_\phi$$

where:

$\dot{Y}_{IJ}$ = velocity error due to I.L.S. and instrument noise.
$\dot{Y}_\phi$ = velocity error due to longitudinal acceleration and compass error.

The acceleration error due to compass error $\Delta\varphi$ is $\Delta\varphi A$, "A" denoting longitudinal deceleration i.e.

$$A = -\frac{dv}{dt}$$

The velocity error accumulated during the pure inertia period is $$\dot{Y}\varphi = \Delta\varphi \int A\, dt = \Delta\varphi(v_C - v_C)$$

Some velocity error also accumulates during the monitored period; its effect is however very much smaller, because at the higher altitudes the windshear is smaller and furthermore the error is to a considerable extent corrected by the monitoring feedback; thus as a first approximation $$\dot{Y}\varphi = \Delta\varphi(v_L - v_C)$$

represents the whole velocity due to compass error accumulated at the instant of correction.

$\Delta\varphi$ can be determined as follows:

$$\Delta\varphi = \Delta\varphi - \Lambda + \Lambda = \tau + \frac{\dot{y}}{v_C} = \tau + \frac{\dot{y}^* - \dot{v}_{IJ} - \dot{Y}_\phi}{v_C}$$

Substituting $\dot{Y}\varphi$ yields $$\Delta\varphi = \frac{v_L}{v_C}\tau + \frac{\dot{y}^*}{v_L} - \frac{\dot{Y}_{IJ}}{v_L} \qquad 14.1$$

$\tau$ is determined by relative heading, i.e. the difference between compass indication and runway heading; $\dot{y}^*$ is given as inertial lateral cross beam velocity indication; assuming first, that $v_L$ and $v_C$ are as well known and $\dot{Y}_{IJ}=0$, the compass error is given by 14.1. If the platform position is corrected by $-\Delta\varphi$ and a cross beam velocity correction of $-\Delta\varphi(v_L-v_A)$ is provided, the cross beam velocity error arising from compass error would be, from the instant of correction onwards, eliminated and the resulting distance error at the end of the run-out greatly reduced.

If $\dot{Y}_{IJ}$ is unknown and generally not zero, an approximation $\Delta\varphi_C$ of compass error $\Delta\varphi$ can be computed from 14.1 by ignoring $\dot{Y}_{IJ}$ i.e.

$$\Delta\varphi_C = \frac{v_L}{v_C}\tau + \frac{\dot{y}^*}{v_L} = \Delta\varphi + \frac{\dot{Y}_{IJ}}{v_L}$$

and the corrections $-\Delta\varphi_C$ to platform position and $-\Delta\varphi(v_L-v_C)$ to velocity output applied.

If there were no correction, the resultant velocity error from compass and other errors would be:

$$\dot{Y}_{IJ} + \varphi(v_L - v) = \dot{Y}_{IJ} + \Delta\varphi(v_L - v_C) + \Delta\varphi(v_C - v)$$

Applying the correction, the resultant error would become:

$$\dot{Y}_{IJ} + (\Delta\varphi - \Delta\varphi_C)(v_L - v_C) + (\Delta\varphi - \Delta\varphi_C)(v_C - v)$$

the second term representing the effect of the velocity correction, and the third term that of platform position correction.

With $$\Delta\varphi - \Delta\varphi_C = -\frac{\dot{Y}_{IJ}}{v_L}$$

the resultant velocity error becomes:

$$\dot{Y}_{IJ}\left[1 - \frac{v_L - v_C}{v_L} - \frac{v_C - v}{v_L}\right] = \dot{Y}_{IJ}\frac{v}{v_L}$$

i.e., the effect of the compass error would still be eliminated, and further, the effect of all other errors reduced by factor $v/v_L$ gradually to zero at the end of the run-out, thus greatly reducing distance error.

Assuming that the instant of correction is determined in all cases by the air speed dropping after touch-down to $v_A=150$ ft./sec. and considering first the case where there is no head wind and $V_L=V_{AL}=200$ ft./sec., then $\Delta\varphi_C$ (in radians) could be determined from:

$$\Delta\varphi_C = \frac{150}{200}\tau + \frac{\dot{y}^*}{200} = \alpha\tau + \beta \dot{y}^*$$

where $\alpha=0.75$ and $\beta=0.005$.

Assuming limiting values for head wind and wind shear condition: $v_L=134$ ft./sec., $v=102$ ft./sec., $\Delta\varphi_C=$ is obtained as:

$$\Delta\varphi_C = \frac{102}{134}\tau + \frac{\dot{y}^*}{134} = \alpha\tau + \beta \dot{y}^*$$

where $\alpha=0.786$, $\beta=0.0075$.

The value of coefficients $\alpha$ and $\beta$ would enable the best possible deduction of platform position error due to compass error with the data available, but they would not necessarily have the most favorable effect in respect of other errors. It should be noted that the variation of the coefficients in the two extreme conditions is comparatively small. Furthermore, exact determination of the coefficients would involve measurement of ground speed which offers considerable difficulties.

It would be preferable as an approximation to replace the variable coefficients $\alpha$ and $\beta$ by absolute constants and also, in order to simplify the system still further, to omit velocity and distance correction and compensate for this by increasing the values for $\alpha$ and $\beta$.

Reasonably good values for reducing run-out error are found to be: $\alpha=1.2$ and $\beta=0.01$ ft./sec.

In the case of otherwise very large errors the correction procedure yields a very large improvement, the resulting error becoming in most cases even smaller than the sum of I.L.S. noise and instrument errors without compass errors.

It should be noted that, assuming a mean value of acceleration during the run-out of say $A-0.2\,g$, the platform position correction could be replaced by an acceleration correction of $\Delta\varphi_C \times 0.2\,g$.

(1) The runway parameters considered, FIG. 12, are:
 Runway heading $\varphi_R$.
 Latitude $\Lambda$.
 Middle marker glide slope range $R\eta$.
 Distance between localizer and glide slope transmitter $R_{yz}$.
 Glideslope angle $\eta$.

These are set manually by potentiometers. To facilitate setting and avoid errors, it would be convenient to position the potentiometers close together so that a pre-printed card for each runway can be slipped over them showing the potentiometer positions.

$\varphi_R$ is for platform setting.
Cos $\Lambda$ cos $\varphi_R$ is required as a correcting torque on the controlling gyro 13 to compensate for the earth's rotation.
$R_{yz}$ is required for computing the localizer range.
$R_m$ for monitoring and adjusting the range at middle marker.

Figure 13:
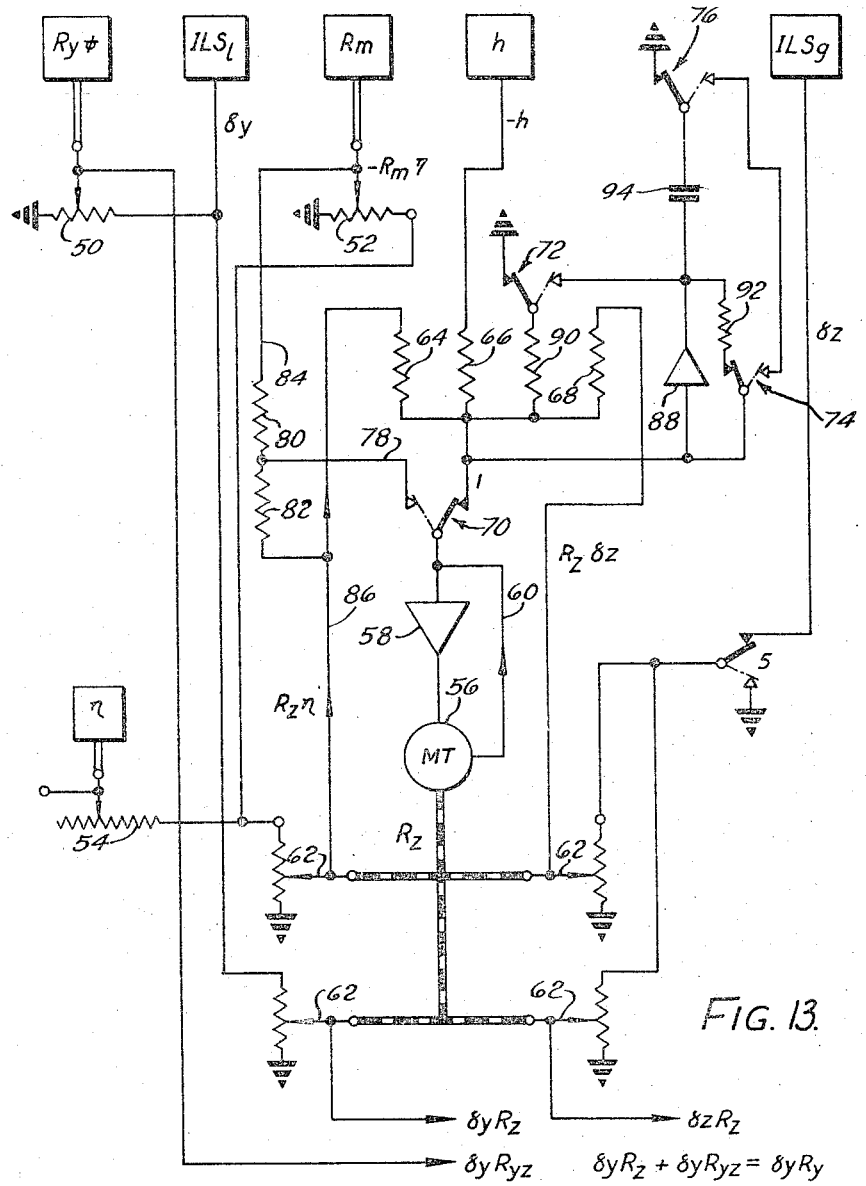
FIGURE 13 is a block diagram of the circuit employed in the system of FIGURE 12 for computing range and I.L.S. distance with facilities for monitoring the former at the middle marker.

(2) The range unit 46 and I.L.S. distance unit 48 of FIG. 12 are shown in detail in FIG. 13. As mentioned above, the parameters $R_{yz}$, $R_m$ and $\eta$ are set manually by the respective potentiometers 50, 52 and 54. In the normal operating condition (switches 70, 72, 74 and 76 as shown) the servo 56 driven by the amplifier 58 with the feedback path 60 as shown moves the taps 62 tending to zero the voltage sum at junction I through the resistors 64, 66 and 68. Thus, the sum $R_z\eta + R_zS_z - h = 0$ i.e. the servo 56 computes range as $$R_z = \frac{h}{\eta + \delta_z}$$

For monitoring and correcting the range at the middle marker, switches 70, 72, 74 and 76 are used. First, the switch 70 is moved to its dash-dot position in response to a "passing" signal from the middle marker. Thus, the servo will tend to zero the input to the amplifier 58 at conductor 78 whereby, because the two resistors 80 and 82 are identical, the voltages in the two conductors 84 and 86 will be made the same value but of opposite sign so that $R_z = R_m$.

Next the switch 72 is operated to connect the high gain amplifier 88 in circuit through the resistors 90 and 92 to make the junction voltage at I zero. The output $n_h$ of the amplifier 88 then becomes $$-R_m(\eta + \delta_z) + h = R_m(\eta = \delta_z) + h_o + n_h = n_h$$

where $h_o = R_m(\eta + \delta_z)$, the correct altitude.

Switches 74 and 76 are then operated connecting the capacitor 94 in circuit so that the amplifier 88 and the capacitor 94 act as a Miller integrator with zero input, maintaining the output $n_h$.

Switch 70 is then returned to its original position; control of the servo 56 is taken over by $-h = -h_o - n_h$ to which the correcting output $n_h$ is added, thus cancelling the altitude error.

(3) *Timing unit.*—The timing unit 100 performs the following functions:

(a) It starts operation when I.L.S. beam is intercepted.
(b) It uncages the controlling gyro 13 and transfers the platform bank control to it.
(c) It controls the gains in the feedback to the integrators. When the gains reach their limiting value, the time unit is stopped. It will be appreciated that the azimuth and elevation integrators 104 and 106 are identical with those described in conjunction with FIG. 1.

(4) *Platform unit.*—This is initially slaved by the conventional synchro transmission components (a synchro transmitter on the sensors, a synchro resolver, amplifier and motor tacho) to the directional gyro and the vertical gyro. When the timing unit starts, control in bank is transferred to the controlling gyro. The platform unit carries the controlling gyro 13 and the accelerometers 108 and 110.

(5) *Integrating units.*—The functions and arrangements of these units were described in detail hereinabove in conjunction with FIG. 1.

Figure 14:
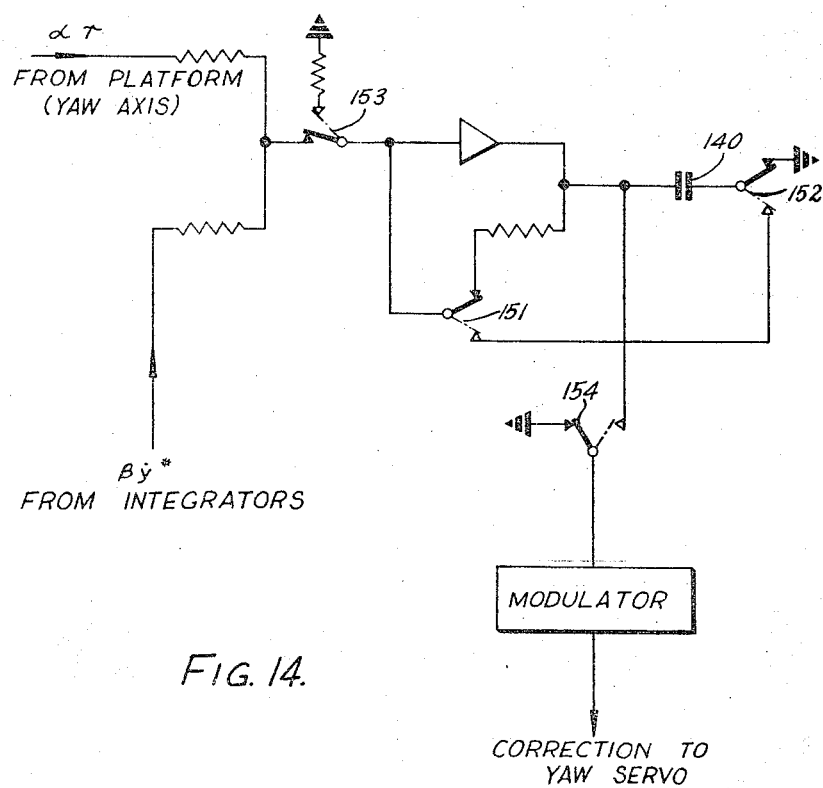
FIGURE 14 is a block diagram of a circuit for effecting runway correction which may be employed in the system for FIGURE 12.

(6) *Runway correction unit.*—This is shown in FIGURE 14. Before the correction takes place (switches as shown) the sum $\alpha\psi + \beta\dot{y}^*$ is formed and stored in the capacitor 140. Switches 151, 152, 153 and 154 are operated in sequence at the instant when $v_A$ drops to 150 ft./sec., after which the stored and maintained value of $\alpha\psi + \beta\dot{y}^*$ is used to correct $\Delta\varphi$.

*Self-monitoring.*—Complete self-monitoring would mean duplication of all elements. Instead of this the following compromise can be made:

(A) During the I.L.S. monitored phase the difference between inertial and I.L.S. distance output $y^* - (y + n_I)$ depends on
(a) I.L.S. noise.
(b) Other error sources.

It is to be expected that if the output of the differential amplifier is lagged by say $1 + PT$, the I.L.S. noise component will be comparatively small. Taking I.L.S. noise values as functions of range as given in the R.T.C.A. paper, the value of the I.L.S. noise component can be evaluated. It was found that this value "M" in no case exceeds 8 ft./10000 ft. of azimuth range and 6 ft./10000 ft. of elevation range, corresponding in I.L.S. to 4.5 $\mu$A in azimuth and 9 $\mu$A in elevation.

These maximum values can be derived from the range unit; all the observed errors exceeding these maxima are caused by errors of instrumentation. The monitoring device thus could be set to indicate excessive errors, e.g. at $(U_{max}) + 8$ ft., about 6 ft. being the R.M.S. value of errors from all other sources. In addition to this the range unit and the distance unit could be monitored in a comparatively simple way by duplicating inexpensive potentiometric arrangements (not shown).

During the pure inertial phase the above self-monitoring procedures are not applicable; however, the time for the phase is short (to touch-down less than 14 sec. in azimuth, to the radio altimeter limit less than about 8–20 sec. in elevation and to final run-out not more than 41 sec.) consequently the probability of equipment which was still working correctly in the monitored phase failing during this time is comparatively small. However, if some sort of self-monitoring is still desired, there are the following possibilities:

(a) Accelerometers and integrators can be monitored by providing a third accelerometer at 45° to the azimuth and elevation accelerometers, and providing a third set of integrators with identical feedback arrangements to azimuth and elevation (this is only possible if the final time constants of both main systems are the same, say 16 sec.). The differential amplifier of the third system would be fed by the scaled sum of both I.L.S. outputs. The output of the third system has to be the scaled sum of the two original systems, i.e. a sum check is provided.

(b) It is easy to monitor (say by potentiometric arrangements) the platform position in pitch and yaw. In the case of bank (controlled by the gyro on the platform) this method is not applicable. A rough check could be provided from the output of the resolver synchro, which during initial slaving to the vertical gyro will have a very small output. When control is taken over by the additional gyro, the synchro resolved will indicate a differential movement between the control and vertical gyros which may amount to slightly more than 1°. Demodulating and differentiating the output would give a differential wander rate which should not substantially exceed twice the wander rate, say 30°/hour of the vertical gyros.

Any value in excess of this would indicate a very large error in the correcting gyro; this would be—if it happens during the monitored phase—far more sensitively detected by the method described. If it occurs during the pure inertia phase, very large errors can be avoided if the control of platform in bank is switched back to the vertical gyro. During the short period of the inertia phase the accumulation of errors due to gyro wander rate is comparatively small (say, at a gyro wander rate of 15°/hour in 20 sec., only 3 feet); the far larger proportion of detectable errors occurs during the monitored phase. It is, however, important that the control of platform position when switching back to the vertical gyro should start from the position which was obtained from the controlling gyro—working still satisfactorily during the monitored phase—and this may differ by 1° from the vertical gyro position. This could be achieved if the demodulated synchro resolver output just before switching over, is stored in a similar way to that described for the middle marker monitoring of the range unit. The stored output would then be used either as a direct correction for the control servo or an equivalent value injected as a correction to the azimuth accelerometer output.

By these means the additional error at touchdown—even on a complete failure of the controlling gyro—may be not larger than 4–5 feet.

Any more accurate self-monitoring methods would involve the duplication of the correcting gyro, i.e. the most expensive part of the equipment.

As intimated above, the circuit for elevation guidance is substantially the same as for azimuth guidance. However, the conditions for satisfactory operation of the former are less severe than for the latter for the following reasons:

The system proposed for elevation is basically the same as in azimuth, with the following differences:

(a) Instead of touch-down vertical deviation the essential criterion is deviation rate at the beginning of the flare-out. Vertical deviation is of secondary importance only, because the altitude at beginning of the flare-out is controlled by radio altimeter indication; a vertical deviation error only causes a range error at beginning of the flare-out and if this error is small in comparison with the length of the runway, the error is irrelevant. This makes the accuracy requirements far less severe.

(b) Owing to the greatly reduced range at the end of the approach the I.L.S. distance noise is also reduced.

(c) The "g" errors resulting from platform setting errors are reduced by factor $\eta$ ($\eta$=glide slope angle). i.e. to ½₀th.

(d) Wind-shear errors are substantially reduced, because the inaccuracy of the vertical gyro setting (½°) is only half that of the compass (1°) and also because no inertia indication is required beyond the flare limit, when the most serious wind-shear effects occur.

(e) Initial errors are considerably smaller because of the narrower width of the glide slope beam and smaller glide slope range.

Owing to the considerably less stringent requirements the elevation system can be simplified in the following ways:

(1) The correction by an additional control gyro can be omitted and the control of the platform performed by the vertical gyro only.

(2) The variation of system gain with time can be omitted.

The only more difficult condition to be met is the increased influence of an error in barometric altitude (see section 5.1) which would limit I.L.S. monitoring at the middle marker, unless provision is made to monitor the accuracy of the altitude measurement at least at the middle marker.

Included in the invention are not only the inertial, and gyroscopic, and electronic elements so combined as to achieve the effects outlined above, but also auto-pilot relays responsive to signals delivered by the system, visual displays of the derived information, and, as may be expedient, switch control means operated automatically or manually to cut out the whole, or any part, of the system. For example, in the run-out phase all effects other than those involved in heading error, may be cut out in response to the incidence of a preseletced undercarriage load.

The foregoing represents an outline of a complete blind-landing system, such as could be used for any landing of any aircraft, whether in conventional usage or as an S.T.O.L. or even a V.T.O.L. type. The magnitude of the order of parameters will, of course, change as between such classes. Basically, what we have set out is a mathematically ordained system involving in general components which are known per se, which when combined according to this invention can enable the pilot of an aircraft, whether the pilot be human or automatic, to make a final approach, flare-out, landing, and if required run-out, in circumstances which involve systematic combinations of information, signals, relaying devices, and—in the sense of progressive correction anticipations—corrections which will enable a terrestrially accurate path (laterally and vertically) to be followed by the aircraft.

To those acquainted with this art it will be apparent that where parameters, such as aircraft weight, are involved in the outcome of a landing, such parameters may be fed into or by the pilot or as may be dictated, and may be integrated in the analysis performed by the invented system.

Moreover, there may be included time-delay factors, especially in the complete embodiment which includes landing-wheel tachometry, so as to ignore purely momentary error, as for example if a tachometrically metered wheel skids on an ice-patch.

I claim:

1. An all weather aircraft landing system comprising an inertial navigation system to produce signals indicative of distance deviation from a desired flight path, I.L.S. receiving means to receive I.L.S. information and produce signals indicative of distance deviation from the desired flight path; a comparator circuit to compare said former signals with the latter and to produce difference signals in response to any difference therebetween, and means for correcting operation of said inertial system in response and according to said difference signals.

2. A system as set forth in claim 1 including means for isolating the inertial system from the comparator circuit so that the landing system can operate as a pure inertial system.

3. An all weather aircraft landing system comprising an inertial navigation system including accelerometer means to produce signals indicative of lateral acceleration with respect to a desired flight path and signals indicative of vertical acceleration with respect to the desired flight path; I.L.S. receiving means to receive I.L.S. information and produce signals indicative of lateral and vertical distance deviation from the desired flight path; integrating-circuit means to integrate the lateral and vertical acceleration signals to yield signals indicative respectively of lateral and vertical distance deviation with respect to the desired flight path; a comparator circuit to compare the lateral and vertical deviation signals of the I.L.S. receiving means and the integrating circuit means to produce an output indicative of any difference therebetween; and means to feed back to the integrating-circuit means the output of the comparator circuit to correct the outputs of the accelerometer means.

4. In a landing system for aircraft comprising, in combination:

gyro means having an output $\ddot{y}$ indicative of acceleration of the aircraft in a direction lateral with respect to a predetermined glide slope path;

integrator means for integrating the output $\ddot{y}$ of said gyro means to produce a lateral position output $y^*$ indicative of the lateral position of the aircraft with respect to the glide slope path according to the gyro means; I.L.S. receiving means for producing an output signal $y$ indicative of lateral deviation of the aircraft with respect to the glide slope path;

comparator means connected to the outputs of said I.L.S. receiving means and said integrator means and having an output $y-y^*$ indicative of the error in the output of said gyro means;

autopilot means for controlling the aircraft according to said output $y^*$;

and feedback means for modifying said output $y^*$ according to said output $y-y^*$.

5. An automatic guidance system for aircraft comprising, in combination, an inertial guidance system having an acceleration output $\ddot{y}$ indicative of acceleration in a horizontal direction which includes a landing glide slope path lateral with respect to a predetermined flight path within a landing approach region and an acceleration output $\ddot{z}$ indicative of vertical acceleration;

integrator means for each acceleration output to produce lateral and vertical signals $y^*$ and $z^*$ indicative respectively of lateral and vertical deviation of the aircraft with respect to the predetermined flight path;

autopilot means controlled by said signals $y^*$ and $z^*$ to maintain the aircraft on the predetermined flight path;

I.L.S. receiving means for producing output signals $y$ and $z$ indicative of lateral and vertical deviations of the aircraft with respect to the glide slope path;

comparator means for comparing said signals $y, z, y^*$ and $z^*$ and having outputs $y-y^*$ and $z-z^*$, and feedback means for modifying said signals $y^*$ and $z^*$ respectively according to $y-y^*$ and $z-z^*$ during the time the aircraft is in the landing approach region.

6. The system according to claim 5 wherein said predetermined flight path also includes a flare-out path, and means for disconnecting said feedback means when the aircraft reach said flare-out path.

7. The system according to claim 6 wherein said feedback means includes a variable gain element for each integrator means;

and means for varying the gain of each variable gain element subsequent to penetration of the aircraft into the landing approach region.

8. The system according to claim 6 wherein each integrator means includes first and second integrators;

said feedback means including a variable gain element for each of said first and second integrators, and means for connecting said variable gain elements to their respective integrators at different zones within said landing approach region.

9. The system according to claim 8 wherein the feedback means for the integrator means for the signal $\dot{y}$ includes an integrator and variable gain element for negative feedback to the signal $\dot{y}$.

10. The system according to claim 5 wherein said integrator means also produce output signals $\dot{y}^*$ and $\dot{z}^*$ indicative respectively of lateral and vertical velocities of the aircraft with respect to the predetermined flight path, said autopilot means also being controlled by the signals $\dot{y}^*$ and $\dot{z}^*$, and seed feedback means also modifying said signals $\dot{y}^*$ and $\dot{z}^*$ according to $y-y^*$ and $z-z^*$, respectively.

11. The system as defined in claim 10 wherein the modifications of the signals $\dot{y}^*$ and $\dot{z}^*$ are effected only during the terminal portion of the glide slope path while the modifications of the signals $y^*$ and $z^*$ are effected throughout the glide slope path.

12. The system according to claim 11 including means for variably controlling the gains of the feedback signals $y-y^*$ and $z-z^*$.

References Cited

UNITED STATES PATENTS

| | | | |
|---|---|---|---|
| 2,808,999 | 10/1957 | Chenery | 244—77 |
| 2,914,763 | 11/1959 | Greenwood et al. | |
| 2,987,275 | 6/1961 | Moncrieff Yeates et al. | 343—108 X |
| 3,041,607 | 6/1962 | Rhodes et al. | 343—108 X |

RODNEY D. BENNETT, *Primary Examiner.*

H. C. WAMSLEY, *Assistant Examiner.*